US008608071B2

(12) United States Patent
Liu et al.

(10) Patent No.: US 8,608,071 B2
(45) Date of Patent: Dec. 17, 2013

(54) OPTICAL INDICIA READING TERMINAL WITH TWO IMAGE SENSORS

(75) Inventors: Yong Liu, Suzhou (CN); Ynjiun Paul Wang, Cupertino, CA (US)

(73) Assignee: Honeywell Scanning and Mobility, Fort Mill, SC (US)

( * ) Notice: Subject to any disclaimer, the term of this patent is extended or adjusted under 35 U.S.C. 154(b) by 0 days.

(21) Appl. No.: 13/274,404

(22) Filed: Oct. 17, 2011

(65) Prior Publication Data

US 2013/0092735 A1    Apr. 18, 2013

(51) Int. Cl.
*G06K 7/00* (2006.01)
(52) U.S. Cl.
USPC .. 235/440; 235/454; 235/462.01; 235/462.45
(58) Field of Classification Search
USPC .......... 235/454, 440, 462.12, 462.17, 462.45, 235/461, 462.01, 462.09
See application file for complete search history.

(56) References Cited

U.S. PATENT DOCUMENTS

| | | |
|---|---|---|
| 3,978,317 A | 8/1976 | Yamaguchi et al. |
| 4,057,784 A | 11/1977 | Tafoya |
| 4,085,423 A | 4/1978 | Tsunoda et al. |
| 4,330,583 A | 5/1982 | Datta et al. |
| 4,333,187 A | 6/1982 | Schuler |
| 4,542,528 A | 9/1985 | Sanner et al. |
| 4,721,849 A | 1/1988 | Davis et al. |
| 4,758,717 A | 7/1988 | Shepard et al. |
| 4,760,248 A | 7/1988 | Swartz et al. |
| 4,774,715 A | 9/1988 | Messenger |
| 4,818,847 A | 4/1989 | Hara et al. |
| 4,841,132 A | 6/1989 | Kajitani et al. |
| 4,847,490 A | 7/1989 | Nishikama |
| 4,866,257 A | 9/1989 | Elliott et al. |
| 4,877,949 A | 10/1989 | Danielson et al. |
| 4,900,907 A | 2/1990 | Matusima et al. |
| 4,918,297 A | 4/1990 | Kurimoto |
| 4,920,255 A | 4/1990 | Gabeler |
| 4,945,216 A | 7/1990 | Tanabe et al. |
| 4,964,167 A | 10/1990 | Kunizawa et al. |
| 5,010,241 A | 4/1991 | Butterworth |
| 5,019,699 A | 5/1991 | Koenck |
| 5,034,619 A | 7/1991 | Hammond, Jr. |
| 5,046,066 A | 9/1991 | Messenger |
| 5,059,778 A | 10/1991 | Zouzoulas et al. |
| 5,059,779 A | 10/1991 | Krichever et al. |
| 5,101,406 A | 3/1992 | Messenger |
| 5,132,525 A | 7/1992 | Swartz et al. |
| 5,149,948 A | 9/1992 | Chisholm |
| 5,157,248 A | 10/1992 | Barkan |
| 5,177,346 A | 1/1993 | Chisholm |
| 5,206,881 A | 4/1993 | Messenger et al. |

(Continued)

*Primary Examiner* — Daniel Hess
*Assistant Examiner* — Paultep Savusdiphol
(74) *Attorney, Agent, or Firm* — Additon, Higgins, Pendleton & Ashe, P.A.

(57) ABSTRACT

An optical indicia reading terminal configured to capture and process an image of decodable indicia can comprise a first image sensor and a second image sensor having overlapping fields of view. The optical indicia reading terminal can further comprise at least one analog-to-digital converter configured to convert analog signals read out of the two image sensors into first and second digital signals, respectively. The optical indicia reading terminal can further comprise a hand held housing encapsulating the two image sensors. The optical indicia reading terminal can further comprise a microprocessor configured to output a decoded message data corresponding to the decodable indicia by processing at least one of the two digital signals.

11 Claims, 3 Drawing Sheets

(56) References Cited

U.S. PATENT DOCUMENTS

| | | | |
|---|---|---|---|
| 5,208,449 | A | 5/1993 | Eastman et al. |
| 5,233,171 | A | 8/1993 | Baldwin |
| 5,235,167 | A | 8/1993 | Dvorkis et al. |
| 5,254,977 | A | 10/1993 | MacDonald |
| 5,280,161 | A | 1/1994 | Niwa |
| 5,280,164 | A | 1/1994 | Barkan |
| 5,286,960 | A | 2/1994 | Longacre, Jr. et al. |
| 5,291,008 | A | 3/1994 | Havens et al. |
| 5,294,783 | A | 3/1994 | Hammond, Jr. et al. |
| 5,296,689 | A | 3/1994 | Reddersen et al. |
| 5,308,962 | A | 5/1994 | Havens et al. |
| 5,317,136 | A | 5/1994 | Hasegawa et al. |
| 5,319,182 | A | 6/1994 | Havens et al. |
| 5,331,176 | A | 7/1994 | Sant'Anselmo et al. |
| 5,340,971 | A | 8/1994 | Rockstein et al. |
| 5,340,972 | A | 8/1994 | Sandor |
| 5,347,113 | A | 9/1994 | Reddersen et al. |
| 5,347,114 | A | 9/1994 | Tanaka |
| 5,378,883 | A | 1/1995 | Batterman et al. |
| 5,389,917 | A | 2/1995 | LaManna et al. |
| 5,396,054 | A | 3/1995 | Krichever et al. |
| 5,404,002 | A | 4/1995 | Tang |
| 5,406,062 | A | 4/1995 | Hasegawa et al. |
| 5,406,063 | A | 4/1995 | Jelen |
| 5,410,141 | A | 4/1995 | Koenck et al. |
| 5,420,411 | A | 5/1995 | Salatto, Jr. et al. |
| 5,430,286 | A | 7/1995 | Hammond, Jr. et al. |
| 5,440,111 | A | 8/1995 | Eastman et al. |
| 5,449,892 | A | 9/1995 | Yamada |
| 5,473,149 | A | 12/1995 | Miwa et al. |
| 5,504,316 | A | 4/1996 | Bridgelall et al. |
| 5,504,317 | A | 4/1996 | Takahashi |
| 5,504,367 | A | 4/1996 | Arackellian et al. |
| 5,510,606 | A | 4/1996 | Worthington et al. |
| 5,532,692 | A | 7/1996 | Tatsuya |
| 5,534,684 | A | 7/1996 | Danielson |
| 5,541,419 | A | 7/1996 | Arackellian |
| 5,550,364 | A | 8/1996 | Rudeen |
| 5,550,367 | A | 8/1996 | Plesko |
| 5,557,095 | A | 9/1996 | Clark et al. |
| 5,572,006 | A | 11/1996 | Wang et al. |
| 5,576,529 | A | 11/1996 | Koenck et al. |
| 5,579,487 | A | 11/1996 | Meyerson et al. |
| 5,585,616 | A | 12/1996 | Roxby et al. |
| 5,591,955 | A | 1/1997 | Laser |
| 5,597,997 | A | 1/1997 | Obata et al. |
| 5,598,007 | A | 1/1997 | Bunce et al. |
| 5,602,376 | A | 2/1997 | Coleman et al. |
| 5,610,595 | A | 3/1997 | Garrabrant et al. |
| 5,612,530 | A | 3/1997 | Sanders et al. |
| 5,623,137 | A | 4/1997 | Powers et al. |
| 5,635,700 | A | 6/1997 | Fazekas |
| 5,637,854 | A | 6/1997 | Thomas |
| 5,638,115 | A | 6/1997 | Imai |
| 5,640,001 | A | 6/1997 | Danielson et al. |
| 5,640,684 | A | 6/1997 | Konosu et al. |
| 5,644,601 | A | 7/1997 | Kawaguchi |
| 5,646,389 | A | 7/1997 | Bravman et al. |
| 5,646,390 | A | 7/1997 | Wang et al. |
| 5,648,650 | A | 7/1997 | Sugifune et al. |
| 5,659,778 | A | 8/1997 | Gingold et al. |
| 5,668,803 | A | 9/1997 | Tymes et al. |
| 5,672,858 | A | 9/1997 | Li et al. |
| 5,684,104 | A | 11/1997 | Funk et al. |
| 5,684,290 | A | 11/1997 | Arackellian et al. |
| 5,696,607 | A | 12/1997 | Yamana et al. |
| 5,697,699 | A | 12/1997 | Seo et al. |
| 5,701,001 | A | 12/1997 | Sugifune et al. |
| 5,703,349 | A | 12/1997 | Meyerson et al. |
| 5,714,745 | A | 2/1998 | Ju et al. |
| 5,714,746 | A | 2/1998 | Dvorkis et al. |
| 5,717,195 | A | 2/1998 | Feng et al. |
| 5,717,221 | A | 2/1998 | Li et al. |
| 5,723,868 | A | 3/1998 | Hammond, Jr. et al. |
| 5,734,153 | A | 3/1998 | Swartz et al. |
| 5,736,726 | A | 4/1998 | VanHorn et al. |
| 5,739,518 | A | 4/1998 | Wang |
| 5,743,633 | A | 4/1998 | Chau et al. |
| 5,744,788 | A | 4/1998 | Metlitsky et al. |
| 5,744,815 | A | 4/1998 | Gurevich et al. |
| 5,745,176 | A | 4/1998 | Lebens |
| 5,754,587 | A | 5/1998 | Kawaguchi |
| 5,756,981 | A | 5/1998 | Roustaei et al. |
| 5,763,864 | A | 6/1998 | O'Hagan et al. |
| 5,777,743 | A | 7/1998 | Bacchi et al. |
| 5,780,034 | A | 7/1998 | Cohen et al. |
| 5,780,831 | A | 7/1998 | Seo et al. |
| 5,780,834 | A | 7/1998 | Havens et al. |
| 5,783,811 | A | 7/1998 | Feng et al. |
| 5,784,102 | A | 7/1998 | Hussey et al. |
| 5,786,586 | A | 7/1998 | Pidhirny et al. |
| 5,793,903 | A | 8/1998 | Lopresti et al. |
| 5,794,145 | A | 8/1998 | Milam |
| 5,801,371 | A | 9/1998 | Kahn et al. |
| 5,802,179 | A | 9/1998 | Yamamoto |
| 5,804,802 | A | 9/1998 | Card et al. |
| 5,804,809 | A | 9/1998 | Eastman et al. |
| 5,811,784 | A | 9/1998 | Tausch et al. |
| 5,814,827 | A | 9/1998 | Katz |
| 5,815,200 | A | 9/1998 | Ju et al. |
| 5,815,811 | A | 9/1998 | Pinard et al. |
| 5,818,528 | A | 10/1998 | Roth et al. |
| 5,821,518 | A | 10/1998 | Sussmeier et al. |
| 5,825,006 | A | 10/1998 | Longacre, Jr. et al. |
| 5,831,254 | A | 11/1998 | Karpen et al. |
| 5,834,749 | A | 11/1998 | Durbin |
| 5,834,754 | A | 11/1998 | Feng et al. |
| 5,837,986 | A | 11/1998 | Barile et al. |
| 5,838,720 | A | 11/1998 | Morelli |
| 5,841,121 | A | 11/1998 | Koenck |
| 5,848,064 | A | 12/1998 | Cowan |
| 5,850,078 | A | 12/1998 | Giordano et al. |
| 5,859,417 | A | 1/1999 | Dvorkis et al. |
| 5,859,970 | A | 1/1999 | Pleso |
| 5,872,354 | A | 2/1999 | Hanson |
| 5,877,487 | A | 3/1999 | Tani et al. |
| 5,886,338 | A | 3/1999 | Arackellian et al. |
| 5,894,348 | A | 4/1999 | Bacchi et al. |
| 5,905,251 | A | 5/1999 | Knowles |
| 5,912,921 | A | 6/1999 | Warren et al. |
| 5,914,478 | A | 6/1999 | Bridgelall |
| 5,920,061 | A | 7/1999 | Feng |
| 5,924,040 | A | 7/1999 | Trompower |
| 5,926,581 | A | 7/1999 | Pritt |
| 5,929,418 | A | 7/1999 | Ehrhart et al. |
| 5,932,139 | A | 8/1999 | Oshima et al. |
| 5,932,862 | A | 8/1999 | Hussey et al. |
| 5,942,741 | A | 8/1999 | Longacre, Jr. et al. |
| 5,942,762 | A | 8/1999 | Hecht |
| 5,945,660 | A | 8/1999 | Nakasuji et al. |
| 5,946,344 | A | 8/1999 | Warren et al. |
| 5,949,052 | A | 9/1999 | Longnacre, Jr. et al. |
| 5,949,054 | A | 9/1999 | Karpen et al. |
| 5,949,056 | A | 9/1999 | White |
| 5,949,057 | A | 9/1999 | Feng |
| 5,955,720 | A | 9/1999 | He et al. |
| 5,962,836 | A | 10/1999 | Tani et al. |
| 5,965,863 | A | 10/1999 | Parker et al. |
| 5,973,681 | A | 10/1999 | Tanigawa et al. |
| 5,975,419 | A | 11/1999 | Dickson et al. |
| 5,984,188 | A | 11/1999 | Dvorkis et al. |
| 5,988,506 | A | 11/1999 | Schaham et al. |
| 5,992,744 | A | 11/1999 | Smith et al. |
| 5,992,746 | A | 11/1999 | Suzuki |
| 6,010,070 | A | 1/2000 | Mizuochi et al. |
| 6,015,088 | A | 1/2000 | Parker et al. |
| 6,019,286 | A | 2/2000 | Li et al. |
| 6,027,024 | A | 2/2000 | Knowles |
| 6,029,893 | A | 2/2000 | Tan et al. |
| 6,034,379 | A | 3/2000 | Bunte et al. |
| 6,036,096 | A | 3/2000 | Evers et al. |
| 6,039,255 | A | 3/2000 | Seo |
| 6,045,047 | A | 4/2000 | Pidhirny et al. |
| 6,045,048 | A | 4/2000 | Wilz, Sr. et al. |

(56) References Cited

U.S. PATENT DOCUMENTS

| | | |
|---|---|---|
| 6,052,236 A | 4/2000 | Nakasuji et al. |
| 6,053,408 A | 4/2000 | Stoner |
| 6,060,722 A | 5/2000 | Havens et al. |
| 6,062,475 A | 5/2000 | Feng |
| 6,066,857 A | 5/2000 | Fantone et al. |
| 6,068,188 A | 5/2000 | Knowles |
| 6,072,401 A | 6/2000 | Kumar |
| 6,092,728 A | 7/2000 | Li et al. |
| 6,098,887 A | 8/2000 | Figarella et al. |
| 6,119,939 A | 9/2000 | Schwartz et al. |
| 6,119,944 A | 9/2000 | Mulla et al. |
| 6,123,261 A | 9/2000 | Roustaei |
| 6,123,264 A | 9/2000 | Li et al. |
| 6,129,283 A | 10/2000 | Imade et al. |
| 6,141,046 A | 10/2000 | Roth et al. |
| 6,147,358 A | 11/2000 | Hecht |
| 6,152,371 A | 11/2000 | Schwartz et al. |
| 6,155,491 A | 12/2000 | Dueker et al. |
| 6,164,544 A | 12/2000 | Schwartz et al. |
| 6,164,546 A | 12/2000 | Kumagai et al. |
| 6,178,426 B1 | 1/2001 | Klein et al. |
| 6,179,208 B1 | 1/2001 | Feng |
| 6,182,897 B1 | 2/2001 | Knowles et al. |
| 6,186,404 B1 | 2/2001 | Ehrhart et al. |
| 6,199,044 B1 | 3/2001 | Ackley et al. |
| 6,213,397 B1 | 4/2001 | Rando |
| 6,223,988 B1 | 5/2001 | Batterman et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,298,176 B2 | 10/2001 | Longacre, Jr. et al. |
| 6,303,929 B1 | 10/2001 | Oshima et al. |
| 6,318,635 B1 | 11/2001 | Stoner |
| 6,318,637 B1 | 11/2001 | Stoner |
| 6,321,989 B1 | 11/2001 | Wilz, Sr. et al. |
| 6,321,991 B1 | 11/2001 | Knowles |
| 6,321,992 B1 | 11/2001 | Knowles et al. |
| 6,323,503 B1 | 11/2001 | Hecht |
| 6,330,973 B1 | 12/2001 | Bridgelall et al. |
| 6,340,114 B1 | 1/2002 | Correa et al. |
| 6,345,764 B1 | 2/2002 | Knowles |
| 6,347,163 B2 | 2/2002 | Roustaei |
| 6,347,743 B2 | 2/2002 | Wilz, Sr. et al. |
| 6,352,204 B2 | 3/2002 | Hattersley et al. |
| 6,352,517 B1 | 3/2002 | Flock et al. |
| 6,360,949 B1 | 3/2002 | Shepard et al. |
| 6,371,374 B1 | 4/2002 | Schwartz et al. |
| 6,375,074 B1 | 4/2002 | Dickson et al. |
| 6,389,010 B1 | 5/2002 | Kubler et al. |
| 6,398,112 B1 | 6/2002 | Li et al. |
| 6,412,699 B1 | 7/2002 | Russell et al. |
| 6,412,700 B1 | 7/2002 | Blake et al. |
| 6,431,452 B2 | 8/2002 | Feng |
| 6,439,462 B1 | 8/2002 | Dickson et al. |
| 6,507,864 B1 | 1/2003 | Klein et al. |
| 6,535,493 B1 | 3/2003 | Lee et al. |
| 6,539,360 B1 | 3/2003 | Kadaba |
| 6,539,422 B1 | 3/2003 | Hunt et al. |
| 6,540,140 B1 | 4/2003 | Knowles et al. |
| 6,547,139 B1 | 4/2003 | Havens et al. |
| 6,561,428 B2 | 5/2003 | Meier et al. |
| 6,578,767 B1 | 6/2003 | Barkan et al. |
| 6,585,159 B1 | 7/2003 | Meier et al. |
| 6,595,422 B1 | 7/2003 | Doljack |
| 6,601,768 B2 | 8/2003 | McCall et al. |
| 6,607,128 B1 | 8/2003 | Schwartz et al. |
| 6,629,641 B2 | 10/2003 | Tsikos et al. |
| 6,637,658 B2 | 10/2003 | Barber et al. |
| 6,655,595 B1 | 12/2003 | Longacre, Jr. et al. |
| 6,661,521 B1 | 12/2003 | Stern |
| 6,669,093 B1 | 12/2003 | Meyerson et al. |
| 6,681,994 B1 | 1/2004 | Koenck |
| 6,688,523 B1 | 2/2004 | Koenck |
| 6,695,209 B1 | 2/2004 | La |
| 6,722,569 B2 | 4/2004 | Ehrhart et al. |
| 6,732,929 B2 | 5/2004 | Good et al. |
| 6,749,120 B2 | 6/2004 | Hung et al. |
| 6,786,414 B2 | 9/2004 | Tsikos et al. |
| 6,808,114 B1 | 10/2004 | Palestini et al. |
| 6,817,525 B2 | 11/2004 | Piva et al. |
| 6,830,184 B2 | 12/2004 | Tsikos et al. |
| 6,832,725 B2 | 12/2004 | Gardiner et al. |
| 6,834,807 B2 | 12/2004 | Ehrhart et al. |
| 6,837,437 B2 | 1/2005 | Tsikos et al. |
| 6,843,417 B1 | 1/2005 | Philyaw et al. |
| 6,877,661 B2 | 4/2005 | Webb et al. |
| 6,888,566 B2 | 5/2005 | Larkin et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,219,843 B2 * | 5/2007 | Havens et al. ........... 235/462.42 |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Mani |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,619,617 B2 | 11/2009 | Morrison et al. |
| 7,646,943 B1 | 1/2010 | Wober |
| 7,656,556 B2 | 2/2010 | Wang |
| 7,693,744 B2 | 4/2010 | Forbes |
| 7,705,309 B1 | 4/2010 | Jin et al. |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 * | 12/2011 | Havens et al. ........... 235/462.45 |
| 8,152,069 B2 * | 4/2012 | Kearney ................... 235/462.06 |
| 2001/0021224 A1 | 9/2001 | Larkin et al. |
| 2003/0062413 A1 | 4/2003 | Gardiner et al. |
| 2003/0085284 A1 | 5/2003 | Bremer et al. |
| 2003/0222144 A1 | 12/2003 | Meier et al. |
| 2003/0222147 A1 * | 12/2003 | Havens et al. ........... 235/462.45 |
| 2004/0020990 A1 * | 2/2004 | Havens et al. ........... 235/472.01 |
| 2004/0133376 A1 | 7/2004 | Uffenkamp et al. |
| 2004/0164165 A1 | 8/2004 | Havens et al. |
| 2004/0171915 A1 | 9/2004 | Glukhovsky et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0151759 A1 | 7/2005 | Banos et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0146340 A1 | 7/2006 | Szwaykowski et al. |
| 2006/0155174 A1 | 7/2006 | Glukhovsky et al. |
| 2006/0163355 A1 | 7/2006 | Olmstead et al. |
| 2006/0202036 A1 | 9/2006 | Wang et al. |
| 2006/0209015 A1 | 9/2006 | Feldmeier et al. |
| 2007/0058164 A1 | 3/2007 | Shibata et al. |
| 2007/0103436 A1 | 5/2007 | Kong |

(56) References Cited

U.S. PATENT DOCUMENTS

| | | |
|---|---|---|
| 2007/0103440 A1 | 5/2007 | Kong et al. |
| 2007/0103441 A1 | 5/2007 | Kong |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0011856 A1 | 1/2008 | Bremer et al. |
| 2008/0023556 A1 | 1/2008 | Vinogradov et al. |
| 2008/0191127 A1 | 8/2008 | Fine et al. |
| 2008/0212838 A1 | 9/2008 | Frigerio |
| 2008/0223933 A1 | 9/2008 | Smith |
| 2009/0026267 A1* | 1/2009 | Wang et al. .............. 235/440 |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2009/0237662 A1 | 9/2009 | Chang et al. |
| 2009/0244292 A1 | 10/2009 | Silverbrook et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0108769 A1 | 5/2010 | Wang et al. |
| 2010/0147956 A1 | 6/2010 | Wang et al. |
| 2010/0172545 A1 | 7/2010 | Lim et al. |
| 2010/0187310 A1 | 7/2010 | Meier et al. |
| 2010/0200649 A1* | 8/2010 | Callegari et al. .............. 235/375 |
| 2010/0324381 A1 | 12/2010 | Glukhovsky et al. |
| 2011/0090476 A1 | 4/2011 | Van De Kerkhoff et al. |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinsburg et al. |
| 2012/0153022 A1 | 6/2012 | Havens et al. |
| 2012/0193421 A1* | 8/2012 | Sauerwein, Jr. .............. 235/455 |
| 2012/0193429 A1 | 8/2012 | Van Volkinsburg et al. |

\* cited by examiner

Overlap of Two Images     Enhanced Resolution

FIG. 3a

Overlap of Two Images     Enhanced Resolution

FIG. 3b

OPTICAL INDICIA READING TERMINAL WITH TWO IMAGE SENSORS

FIELD OF THE INVENTION

The present invention relates to indicia reading terminals in general and in particular to an optical indicia reading terminal.

BACKGROUND OF THE INVENTION

The use of optical indicia, such as bar code symbols, for product and article identification is well known in the art. Presently, various types of indicia reading terminals have been developed, such as hand-held bar code scanners, hands-free scanners, bi-optic in-counter scanners, and mobile computers such as personal digital assistants (PDAs).

One common type of indicia reading terminal is the digital imager, which includes 1D (linear) imagers and 2D (area) imagers. Variable focus digital imagers typically utilize a lens to focus the image of the bar code onto a multiple pixel image sensor, to capture an image for recognition and decoding purposes. Resolution of the image sensor is one of the key parameters defining the depth of field of the indicia reading terminal.

SUMMARY OF THE INVENTION

There is provided an optical indicia reading terminal configured to capture and process an image of decodable indicia. The optical indicia reading terminal can comprise a first image sensor and a second image sensor having overlapping fields of view. The optical indicia reading terminal can further comprise at least one analog-to-digital converter configured to convert analog signals read out of the two image sensors into first and second digital signals, respectively. The optical indicia reading terminal can further comprise a hand held housing encapsulating the two image sensors. The optical indicia reading terminal can further comprise a microprocessor configured to output a decoded message data corresponding to the decodable indicia by processing at least one of the two digital signals.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

For both fixed focus and variable focus imager-based optical indicia reading terminals, resolution of the image sensor is one of the key parameters determining the terminal's depth of field (DOF), which is the distance between the nearest and farthest objects that appear acceptably sharp in an image taken by the terminal to allow successful decoding of decodable indicia. Higher image sensor resolution leads to deeper DOF values thus allowing to reliably decode optical indicia located at greater distances from the terminal. However, increasing image sensor resolution can be prohibitively expensive.

One way to increase the image resolution is to utilize two overlapping images obtained from two image sensors. Using an appropriate algorithm, the resulting image can have a sub-pixel resolution relatively to at least one of the two original images taken by the two image sensors. Thus, an optical indicia reading terminal having two image sensors can have a deeper DOF and better image resolution as compared with traditional single image sensor implementations.

In one embodiment, there is provided an optical indicia reading terminal equipped with a two image sensors. The associated image sensor circuitries can be configured to read out analog signals representative of light incident on the respective image sensor pixels and then to store two frames of image data in the terminal's memory by converting the analog signals to digital values. The optical indicia reading terminal can be configured to construct an image of decodable indicia by processing the two frames of image data. The resulting image can have a sub-pixel resolution relatively to at least one of the two original images taken by the two image sensors. The optical indicia reading terminal can be further configured to process the resulting image for decoding the decodable indicia.

As used herein, "decodable indicia" is intended to denote a representation of a message, such as the representation in a bar code symbology of a character string comprising alphanumeric and non-alphanumeric characters. Decodable indicia can be used to convey information, such as the identification of the source and the model of a product, for example in a UPC bar code that comprises twelve encoded symbol characters representing numerical digits.

Figure 1:
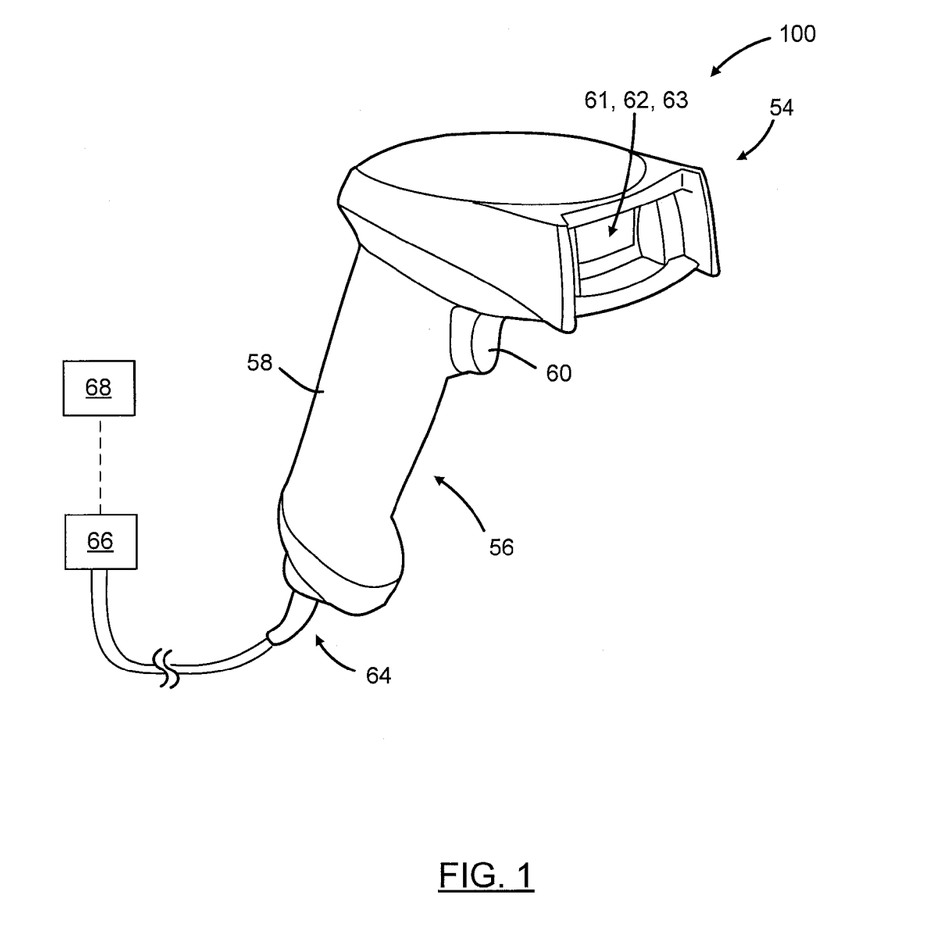
FIG. 1 schematically illustrates one embodiment of an optical indicia reading terminal.

In an illustrative embodiment, shown in FIG. 1, there is provided an optical indicia reading terminal 100 including a housing 52 comprising a head portion 54 and a handle portion 56, the latter further comprising a hand grip 58 and a trigger 60. The trigger 60 can be used to initiate signals for activating frame readout and/or certain decoding processes. Other components of optical indicia reading terminal 100 can be disposed within the housing 52. For example, two image sensors 61, 62 can be disposed in the head portion 54 behind a housing window 63. The image sensors 61, 62 can be configured to output an electrical signal representative of light incident on the image sensor. In one embodiment, two image sensors 61, 62 can be spatially oriented generally in the same direction and have at least partially overlapping fields of view (FOVs).

Optical indicia reading terminal 100 can further comprise an I/O interface which in the illustrative embodiment of FIG. 1 can be communicatively coupled to a wired connection 66. The I/O interface can be used to communicatively couple optical indicia reading terminal 100 to a companion device 68 such as a register and/or peripheral data capture devices in a point-of-sale (POS) application. Other configurations of the I/O interface may utilize wireless communication technology and/or contact-type features that do not require wires and/or wired connection 66. In certain applications of optical indicia reading terminal 100 for example, the companion device 68 may be provided by a docking station with corresponding mating contacts and/or connectors that are useful to exchange power and data, including image data captured by the imaging module 62.

Although not incorporated in the illustrative embodiment of FIG. 1, optical indicia reading terminal 100 can also comprise a number of peripheral devices, including a display for displaying such information as image frames captured by the terminal, a keyboard, and a pointing device.

Optical indicia reading terminal 100 can be used, for example, for bar code reading and decoding in POS and other applications. A skilled artisan would appreciate the fact that other uses of optical indicia reading terminal 100 are within the scope of this disclosure.

While FIG. 1 illustrates a hand held housing, a skilled artisan would appreciate the fact that other types and form factors of terminal housings are within the scope of this disclosure.

Figure 2:
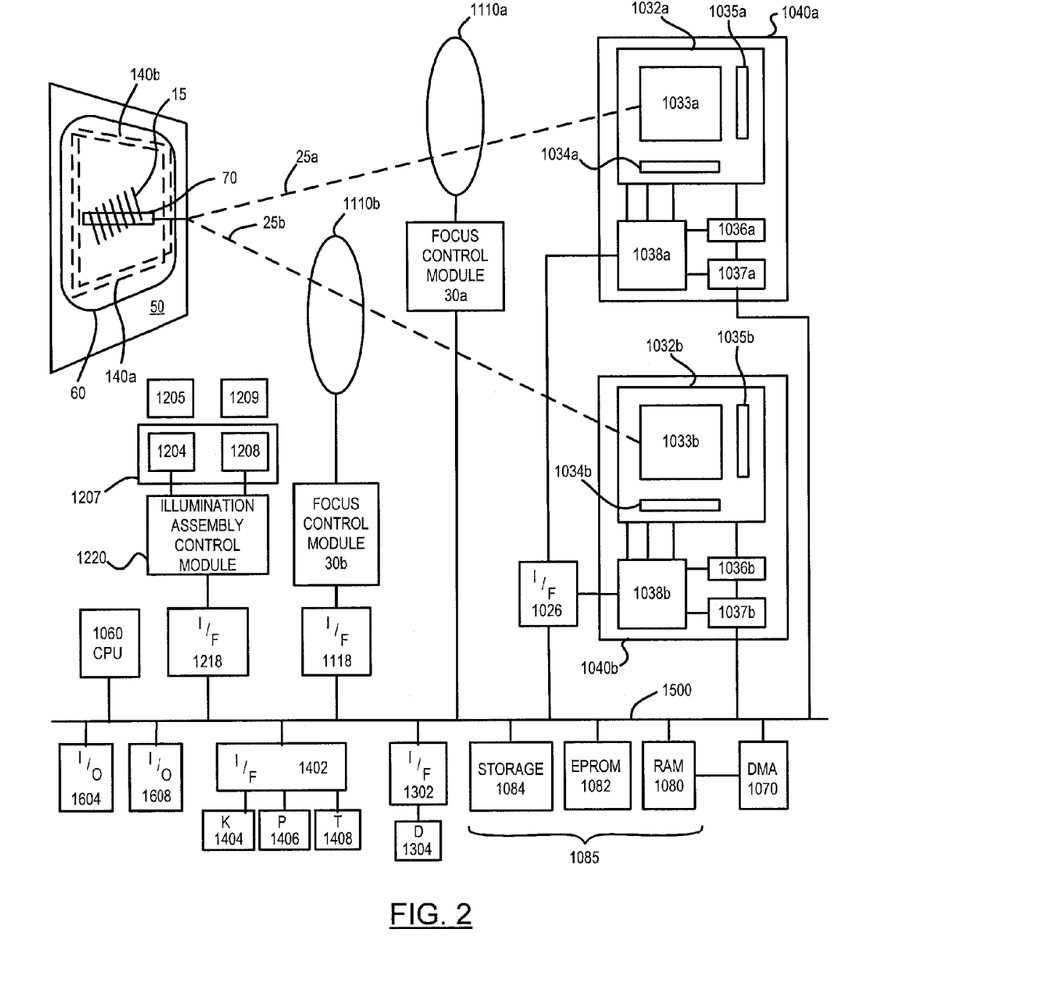
FIG. 2 illustrates a block diagram of one embodiment of the optical indicia reading terminal.

FIG. 2 illustrates a block diagram of one embodiment of the optical indicia reading terminal. Indicia reading terminal 100 can include a first image sensor 1032a comprising a multiple pixel image sensor array 1033a having pixels arranged in rows and columns, associated column circuitry 1034a, and row circuitry 1035a. Indicia reading terminal 100 can include a second color image sensor 1032b comprising a multiple pixel image sensor array 1033b having pixels arranged in rows and columns, associated column circuitry 1034b, and row circuitry 1035b.

In one embodiment, at least one of image sensor arrays 1033a-1033b can be provided by a charge-coupled device (CCD) image sensor. In another embodiment, at least one of image sensor arrays 1033a-1033b can be provided by a complementary metal-oxide semiconductor (CMOS) image sensor. A skilled artisan would appreciate the fact that other types of image sensor arrays are within the scope of the invention.

Associated with the first image sensor 1032a can be amplifier circuitry 1036a, and an analog to digital converter 1037a which can convert image information in the form of analog signals read out of image sensor 1033a into image information in the form of digital signals. The first image sensor 1032a can also have an associated timing and control circuit 1038a for use in controlling e.g., the exposure period of image sensor 1032a, and gain applied to the amplifier circuitry 1036a. The noted circuit components 1032a, 1036a, 1037a, and 1038a can be packaged into a common image sensor integrated circuit 1040a.

Associated with the second image sensor 1032b can be amplifier circuitry 1036b, and an analog to digital converter 1037b which can convert image information in the form of analog signals read out of image sensor 1033b into image information in the form of digital signals. The first image sensor 1032b can also have an associated timing and control circuit 1038a for use in controlling e.g., the exposure period of image sensor 1032b, and gain applied to the amplifier circuitry 1036a. The noted circuit components 1032b, 1036b, 1037b, and 1038b can be packaged into a common image sensor integrated circuit 1040b.

In operation, the light falling on the surface of image sensor 1032a-1032b can cause accumulation of charge in each pixel. The indicia reading terminal 100 can be configured to read out analog signals representative of light incident on one or more pixels. The analog signals can then be fed to the input of the ADC 1037a-1037b. The resulting digital values representative of the analog signals can be stored in a system memory such as RAM 1080. Image frame data stored in RAM 1080 can be in the form of multibit pixel values, with each multibit pixel value representing light incident on a pixel of image sensor 1033a-1033b. Memory 1085 of terminal 100 can include RAM 1080, a nonvolatile memory such as EPROM 1082 and a storage memory device 1084 such as may be provided by a flash memory or a hard drive memory. Terminal 100 can be further configured to process the stored frame of image data for decoding decodable indicia.

In one embodiment, individual image sensor circuitry elements (such as, fox example, analog signal amplifier 1036a-1036b, ADC 1037a-1037b, interface circuit 1026) can be provided for each image sensor 1032a-1032b. In another embodiment, a single image sensor circuitry element (such as, for example, analog signal amplifier 1036, ADC 1037, interface circuit 1026) can be provided to be shared among the image sensors image sensor 1032a-1032b.

In another aspect, indicia reading terminal 100 can include microprocessor 1060 which can be adapted to read out image data stored in memory 1080 and subject such image data to various image processing algorithms.

In one embodiment, terminal 100 can include a direct memory access unit (DMA) 1070 for routing image information read out from image sensor 1032 that has been subject to conversion and storage to RAM 1080. In another embodiment, terminal 100 can employ a system bus providing for bus arbitration mechanism (e.g., a PCI bus) thus eliminating the need for a central DMA controller. Other embodiments of the system bus architecture and/or direct memory access components providing for efficient data transfer between the image sensors 1032a-1032b and RAM 1080 can be provided.

In another aspect, indicia reading terminal 100 can comprise a first variable focus imaging lens 1110a for use in focusing an image of a decodable indicia located within a field of view 140a on a substrate 50 onto image sensor 1032a. Imaging light rays can be transmitted along the imaging axis 25a. Variable focus imaging lens 1110a can be adapted to be capable of multiple best focus distances and multiple focal lengths. Variable focus imaging lens 1110a can be operative to provide a new best focus distance and/or focal length within a fraction of a frame time in response to an applied input control signal being applied to the variable focus imaging lens 1110a.

Indicia reading terminal 100 can further comprise a second variable focus imaging lens 1110b for use in focusing an image of a decodable indicia located within a field of view 140b on a substrate 50 onto image sensor 1032b. Imaging light rays can be transmitted along the imaging axis 25b. Variable focus imaging lens 1110a can be adapted to be capable of multiple best focus distances and multiple focal lengths. Variable focus imaging lens 1110b can be operative to provide a new best focus distance and/or focal length within a fraction of a frame time in response to an applied input control signal being applied to the variable focus imaging lens 1110b.

In one embodiment the fields of view 140a-140b of the first image sensor 1032a and the second image sensor 1032b can at least partially overlap.

In one embodiment, at least one of variable focus imaging lenses 1110a-1110b can be provided by a deformable imaging lens, e.g., a deformable fluid lens or gel lens. In another embodiment, at least one of variable focus imaging lenses 1110a-1110b can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

In a further aspect, indicia reading terminal 100 can also include an illumination pattern light source bank 1204 for use in generating an illumination pattern 60 substantially corresponding to a field of view 140 of terminal 100 and an aiming pattern light source bank 1208 for use in generating an aiming pattern 70 on substrate 50. Shaping optics 1205 and 1209 can be provided for shaping light from bank 1204 and bank 1208 into pattern 60 and into pattern 70 respectively. In use, terminal 100 can be oriented by an operator with respect to a substrate 50 bearing decodable indicia 15 in such manner that aiming pattern 70 is projected on a decodable indicia 15. In the example of FIG. 2, decodable indicia 15 is provided by a 1D bar code symbol. Decodable indicia could also be provided by 2D bar code symbols or optical character recognition (OCR) characters.

Each of illumination pattern light source bank 1204 and aiming pattern light source bank 1208 can include one or more light sources. Variable focus imaging lenses 1110a-1110b can be controlled with use of focus control module 30 and the illumination assembly 1207 comprising illumination pattern light source bank 1204 and aiming pattern light source bank 1208 can be controlled with use of illumination assembly control module 1220. Focus control module 30 can send signals to each of variable focus imaging lenses 1110a-1110b, for example, for changing a best focus distance and/or a focal length of the respective variable focus imaging lenses 1110a-1110b. Illumination assembly control module 1220 can send signals to illumination pattern light source bank 1204, for example, for changing a level of illumination output by illumination pattern light source bank 1204.

In one example, the indicia reading terminal 100 can be adapted so that illumination assembly control module 1220 controls light source bank 1204 to have a relatively lower level of illumination output when the best focus distance of at least one of imaging lenses 1110a-1110b is set to a first shorter best focus distance, and a relatively higher level of illumination output when the best focus distance of at least one of imaging lenses 1110a-1110b is set at a longer best focus distance. Such variable illumination settings can be varied within a time that trigger signal 502 remains active.

Indicia reading terminal 100 can also include a number of peripheral devices, e.g., a display 1304 for displaying such information as captured image frames, keyboard 1404, pointing device 1406, and trigger 1408 which may be used to make active a trigger signal 502 for activating frame readout and/or certain decoding processes. The indicia reading terminal 100 can be adapted so that activation of trigger 1408 activates trigger signal 502 and initiates a decode attempt.

Indicia reading terminal 100 can also include various interface circuits for coupling the peripheral devices to system address/data bus (system bus) 1500, for communication with microprocessor 1060 which can also be coupled to system bus 1500. The indicia reading terminal 100 can include interface circuit 1026 for coupling image sensor timing and control circuit 1038 to system bus 1500, interface circuit 1118 for coupling focus control module 30 to system bus 1500, interface circuit 1218 for coupling illumination control assembly 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, indicia reading terminal 100 can include one or more I/O interfaces 1604, 1608 for providing communications with external devices (e.g., a cash register server, a store server, an inventory facility server, a peer terminal 100, a local area network base station, or a cellular base station). I/O interfaces 1604, 1608 can be interfaces of any combination of known computer interfaces, e.g., Ethernet (IEEE 802.3), USB, IEEE 802.11, Bluetooth, CDMA, GSM.

Figure 3A:
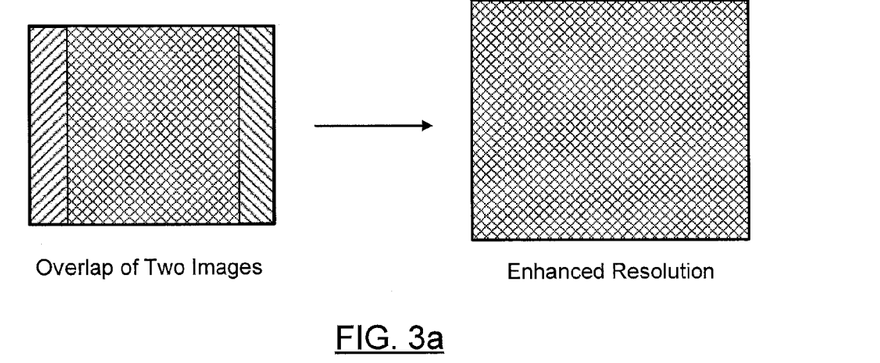
FIG. 3 illustrates enhancing image resolution by processing two overlapping image frames.
Figure 3B:
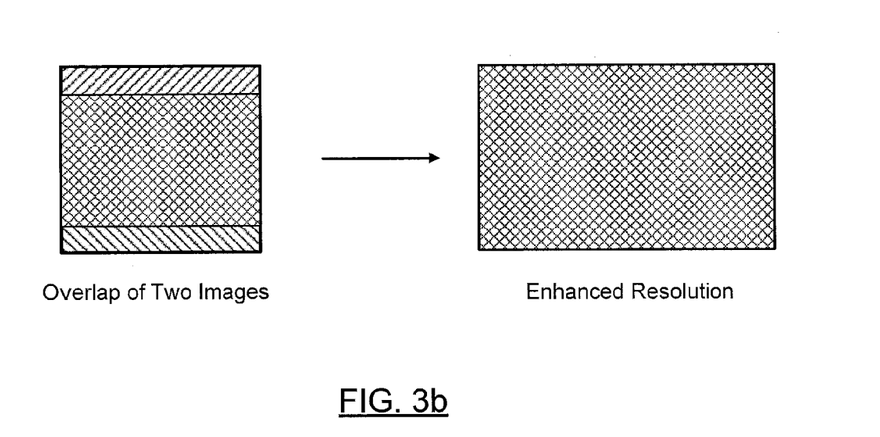

As noted herein supra, indicia reading terminal 100 can include two image sensors. The associated image sensor circuitries can be configured to read out analog signals representative of light incident on the respective image sensor pixels and then to store two frames of image data in the terminal's memory by converting the analog signals to digital values. The optical indicia reading terminal can be configured to construct an image of decodable indicia by processing the two frames of image data. The resulting image can have a sub-pixel resolution relatively to at least one of the two original images taken by the two image sensors, as shown in FIGS. 3a-3b. The optical indicia reading terminal can be further configured to process the resulting image for decoding the decodable indicia.

In order to construct an image having a sub-pixel resolution relatively to at least one of the two original images taken by the two image sensors, the optical indicia reading terminal can be configured to perform the image registration, which is the process of aligning two or more original images taken by the two image sensors. The differences between the input image and the output image can occur as a result of imaging the same object from different viewpoints, differences between the two sensors (including sensitivity and defects) and lenses (including defects).

In a further aspect, one or more images referred to as input images can be aligned with a reference image by applying one or more spatial transformations. A spatial transformation modifies spatial relationships between pixels in an image, mapping pixel locations in an input image to new locations in an output image. Spatial transformations can include: resizing (scaling) an image, rotating an image, cropping an image, and shifting an image.

A sub-pixel resolution image can be generated using the registered image and the reference image by putting pixels of the registered image into the reference image, e.g., using a weighted or non-weighted nearest neighbor algorithm.

A small sample of systems methods and apparatus that are described herein is as follows:

A1. An optical indicia reading terminal configured to capture and process an image of decodable indicia, said optical indicia reading terminal comprising:

a first image sensor having a first field of view (FOV);

a second image sensor having a second FOV overlapping with said first FOV;

at least one analog-to-digital converter configured to convert a first analog signal read out of said first image sensor into a first digital signal, said analog-to-digital converter further configured to convert a second analog signal read out of said second image sensor into a second digital signal;

a hand held housing encapsulating said first image sensor and said second image sensor;

a microprocessor configured to output a decoded message data corresponding to said decodable indicia by processing at least one of: said first digital signal, said second digital signal.

A2. The optical indicia reading terminal of A1 further configured to store said first digital signal in a memory buffer.

A3. The optical indicia reading terminal of A1, wherein said microprocessor is configured to construct an image of said decodable indicia by processing said first digital signal and said second digital signal.

A4. The optical indicia reading terminal of A1, wherein said microprocessor is configured to construct a first image of said decodable indicia by processing said first digital signal;

wherein said microprocessor is further configured to construct a second image of said decodable indicia by processing said second digital signal;

wherein said microprocessor is further configured to construct a third image of said decodable indicia by processing said first image and said second image;

wherein said third image has a sub-pixel resolution relatively to at least one of: said first image, said second image.

A5. The optical indicia reading terminal of A1, wherein said microprocessor is configured to construct a first image of said decodable indicia by processing said first digital signal, said first image having a first resolution insufficient to decode said decodable indicia;

wherein said microprocessor is further configured to construct a second image of said decodable indicia by processing said second digital signal, said second image having a second resolution insufficient to decode said decodable indicia;

wherein said microprocessor is further configured to construct a third image of said decodable indicia by processing said first image and said second image, said third image having a third resolution sufficient to decode said decodable indicia.

A6. The optical indicia reading terminal of A1 further comprising at least one imaging lens configured to focus an image of said decodable indicia on at least one of: said first image sensor, said second image sensor.

A7. The optical indicia reading terminal of A1 further comprising a Bayer pattern filter disposed over said first image sensor.

A8. The optical indicia reading terminal of A1, wherein said first image sensor comprises a multiple pixel image sensor array having pixels arranged in rows and columns, a column circuitry, and a row circuitry.

A9. The optical indicia reading terminal of A1, wherein said first image sensor comprises a multiple pixel image sensor array having pixels arranged in rows and columns, said image sensor array provided by a charge-coupled device (CCD) image sensor.

A10. The optical indicia reading terminal of A1, wherein said first image sensor comprises a multiple pixel image sensor array having pixels arranged in rows and columns, said image sensor array provided by a complementary metal-oxide semiconductor (CMOS) image sensor.

A11. The optical indicia reading terminal of A1 further comprising at least one of: a display, a keyboard, and a communication interface.

A12. The optical indicia reading terminal of A1 further comprising a trigger for activating readout of said analog signal.

While the present invention has been described with reference to a number of specific embodiments, it will be understood that the true scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. An optical indicia reading system configured to capture and process an image of decodable indicia, said optical indicia reading system comprising:
   a decodable indicia;
   a first image sensor having a first field of view (FOV) fully including the decodable indicia;
   a second image sensor having a second FOV, the second FOV fully including the decodable indicia, wherein a majority of an area delimited by the second FOV overlaps with a majority of an area delimited by the first FOV;
   at least one analog-to-digital converter configured to convert a first analog signal read out of said first image sensor into a first digital signal, said analog-to-digital converter further configured to convert a second analog signal read out of said second image sensor into a second digital signal;
   a microprocessor;
   a hand held housing encapsulating said first image sensor and said second image sensor;
   wherein said microprocessor is configured to construct a first image including a representation of a full spatial area of said decodable indicia by processing said first digital signal, said first image having a first resolution insufficient to decode said decodable indicia;
   wherein said microprocessor is further configured to construct a second image including a representation of a full spatial area of said decodable indicia by processing said second digital signal, said second image having a second resolution insufficient to decode said decodable indicia;
   wherein said microprocessor is further configured to construct a third image including a representation of a full spatial area of said decodable indicia by processing said first image and said second image, said third image having a third resolution sufficient to decode said decodable indicia, said third resolution being of sub-pixel resolution relative to said first resolution, said third resolution being of sub-pixel resolution relative to said second resolution;
   wherein said microprocessor is further configured to output a decoded message data corresponding to said decodable indicia by processing the third image.

2. The optical indicia reading system of claim 1 further configured to store said first digital signal in a memory buffer.

3. The optical indicia reading system of claim 1, wherein said microprocessor is configured to construct an image of said decodable indicia by processing said first digital signal and said second digital signal.

4. The optical indicia reading system of claim 1 further comprising at least one imaging lens configured to focus an image of said decodable indicia on at least one of: said first image sensor, said second image sensor.

5. The optical indicia reading system of claim 1 further comprising a Bayer pattern filter disposed over said first image sensor.

6. The optical indicia reading system of claim 1, wherein said first image sensor comprises a multiple pixel image sensor array having pixels arranged in rows and columns, a column circuitry, and a row circuitry.

7. The optical indicia reading system of claim 1, wherein said first image sensor comprises a multiple pixel image sensor array having pixels arranged in rows and columns, said image sensor array provided by a charge-coupled device (CCD) image sensor.

8. The optical indicia reading system of claim 1, wherein said first image sensor comprises a multiple pixel image sensor array having pixels arranged in rows and columns, said image sensor array provided by a complementary metal-oxide semiconductor (CMOS) image sensor.

9. The optical indicia reading system of claim 1 further comprising at least one of: a display, a keyboard, and a communication interface.

10. The optical indicia reading system of claim 1 further comprising a trigger for activating readout of said analog signal.

11. The optical indicia reading system of claim 1 wherein a value of said second resolution is different from a value of said first resolution.

* * * * *